US007386587B2

(12) United States Patent
Chung et al.

(10) Patent No.: US 7,386,587 B2
(45) Date of Patent: Jun. 10, 2008

(54) REPRODUCING APPARATUS AND SERVER SYSTEM PROVIDING ADDITIONAL INFORMATION THEREFOR

(75) Inventors: Hyun-kwon Chung, Gyeonggi-do (KR); Jung-kwon Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 922 days.

(21) Appl. No.: 09/903,630

(22) Filed: Jul. 13, 2001

(65) Prior Publication Data

US 2002/0143902 A1    Oct. 3, 2002

(30) Foreign Application Priority Data

Mar. 10, 2001  (KR)  ............................... 2001-12444

(51) Int. Cl.
    *G06F 15/16*    (2006.01)
(52) U.S. Cl. ..................... 709/203; 709/217; 709/219
(58) Field of Classification Search ........ 709/217–219, 709/203; 705/58; 707/204; 713/184
    See application file for complete search history.

(56) References Cited

U.S. PATENT DOCUMENTS

| 5,701,343 | A  | * | 12/1997 | Takashima et al. ........... 705/51 |
| 5,774,664 | A  |   | 6/1998  | Hidary et al. |
| 5,774,670 | A  | * | 6/1998  | Montulli ..................... 709/227 |
| 6,202,056 | B1 |   | 3/2001  | Nuttall ........................ 705/52 |
| 6,226,655 | B1 | * | 5/2001  | Borman et al. .......... 715/501.1 |
| 6,345,256 | B1 | * | 2/2002  | Milsted et al. ................. 705/1 |
| 6,389,538 | B1 | * | 5/2002  | Gruse et al. ................ 713/194 |
| 6,418,421 | B1 | * | 7/2002  | Hurtado et al. ............... 705/54 |
| 6,449,226 | B1 | * | 9/2002  | Kumagai ................... 369/47.1 |
| 6,505,160 | B1 | * | 1/2003  | Levy et al. .................. 704/270 |
| 6,587,127 | B1 | * | 7/2003  | Leeke et al. ................ 715/765 |
| 6,618,335 | B2 | * | 9/2003  | Tanaka et al. ........... 369/53.21 |
| 6,751,654 | B2 |   | 6/2004  | Massarani et al. |
| 6,810,200 | B1 | * | 10/2004 | Aoyama et al. ............... 386/94 |
| 6,829,368 | B2 | * | 12/2004 | Meyer et al. ............... 382/100 |
| 2001/0005838 | A1 | * | 6/2001 | So ............................... 705/57 |
| 2001/0044838 | A1 | * | 11/2001 | Iida ............................ 709/219 |

(Continued)

FOREIGN PATENT DOCUMENTS

EP    0 886 276    12/1998

(Continued)

OTHER PUBLICATIONS

Japanese Office Action, Jun. 1, 2004.*

(Continued)

*Primary Examiner*—Jason D Cardone
*Assistant Examiner*—Jeffrey R Swearingen
(74) *Attorney, Agent, or Firm*—Stein, McEwen & Bui, LLP

(57) ABSTRACT

A reproduction apparatus and a server system to provide additional information, the reproduction apparatus reproduces one of contents stored on the storage medium, such as a CD or DVD, and includes an identifier generator to generate the identifier of the contents, a network connector, and a controller to transmit the identifier generated by the identifier generator to a server system providing the additional information through the network connector, to receive the additional information provided from the server system through the network connector and to reproduce the received additional information.

33 Claims, 4 Drawing Sheets

U.S. PATENT DOCUMENTS

2002/0052933 A1 * 5/2002 Leonhard et al. .......... 709/219

FOREIGN PATENT DOCUMENTS

| | | | |
|---|---|---|---|
| JP | 7-296508 | * | 11/1995 |
| JP | 8-153331 | * | 6/1996 |
| JP | 8-160855 | * | 6/1996 |
| JP | 9-214923 | * | 8/1997 |
| JP | 10-21263 | * | 1/1998 |
| JP | 10-116472 | | 5/1998 |
| JP | 10-177767 | * | 6/1998 |
| JP | 11-260045 | | 9/1999 |
| JP | 11-271071 | | 10/1999 |
| JP | 11-296587 | * | 10/1999 |
| JP | 11-341440 | * | 12/1999 |
| JP | 2000-308025 | * | 11/2000 |
| JP | 2000-311135 | | 11/2000 |
| JP | 2000-322353 | * | 11/2000 |
| JP | 2001-014250 | | 1/2001 |
| JP | 2001-42866 | * | 2/2001 |
| JP | 2001-051839 | | 2/2001 |
| JP | 2001-60179 | * | 3/2001 |
| JP | 2001-202312 | | 7/2001 |
| KR | 2000-71986 | * | 12/2000 |
| WO | 98/03923 | | 6/1997 |
| WO | WO 98/03923 | * | 6/1997 |
| WO | 99/55055 | | 4/1999 |
| WO | WO 99/55055 | * | 4/1999 |
| WO | 00/65509 | | 4/2000 |
| WO | WO 00/65509 | * | 4/2000 |
| WO | WO 00/45303 | * | 8/2000 |
| WO | 00/63903 | | 10/2000 |
| WO | WO 00/63772 | | 10/2000 |
| WO | WO 00/63903 | | 10/2000 |
| WO | WO 00/63915 | | 10/2000 |
| WO | WO 1/08021 A1 | * | 2/2001 |

OTHER PUBLICATIONS

Japanese Office Action, Jan. 27, 2004 for corresponding Japanese Patent Application No. 2001-246689.*
RealJukebox 2 Plus Manual, Chapters 2 and 4, 2000.*
Lin, Daniel et al. "Taking the Byte Out of Cookies : Privacy, Constent, and the Web". ACM Policy Proceedings of the ethics and social impact component on Shaping Policy in the Information Age. ACM Press. Washington, D.C. 1998. pp. 39-51.*
Kurose, James et al. Computer Networking: A Top-Down Approach Featuring the Internet. Addison-Wesley, 2001. 383-385.*
RealJukebox 2 Plus™ Manual, Chapters 2 and 4 (Copyright 2000).
Japanese Office Action dated Jan. 27, 2004 for corresponding Japanese Patent Application No. 2001-246689.
Japanese Office Action dated Jun. 1, 2004.
Office Action issued by Japanese Patent Office in Japanese Patent Application No. 2004-130109 on Feb. 6, 2007.

* cited by examiner

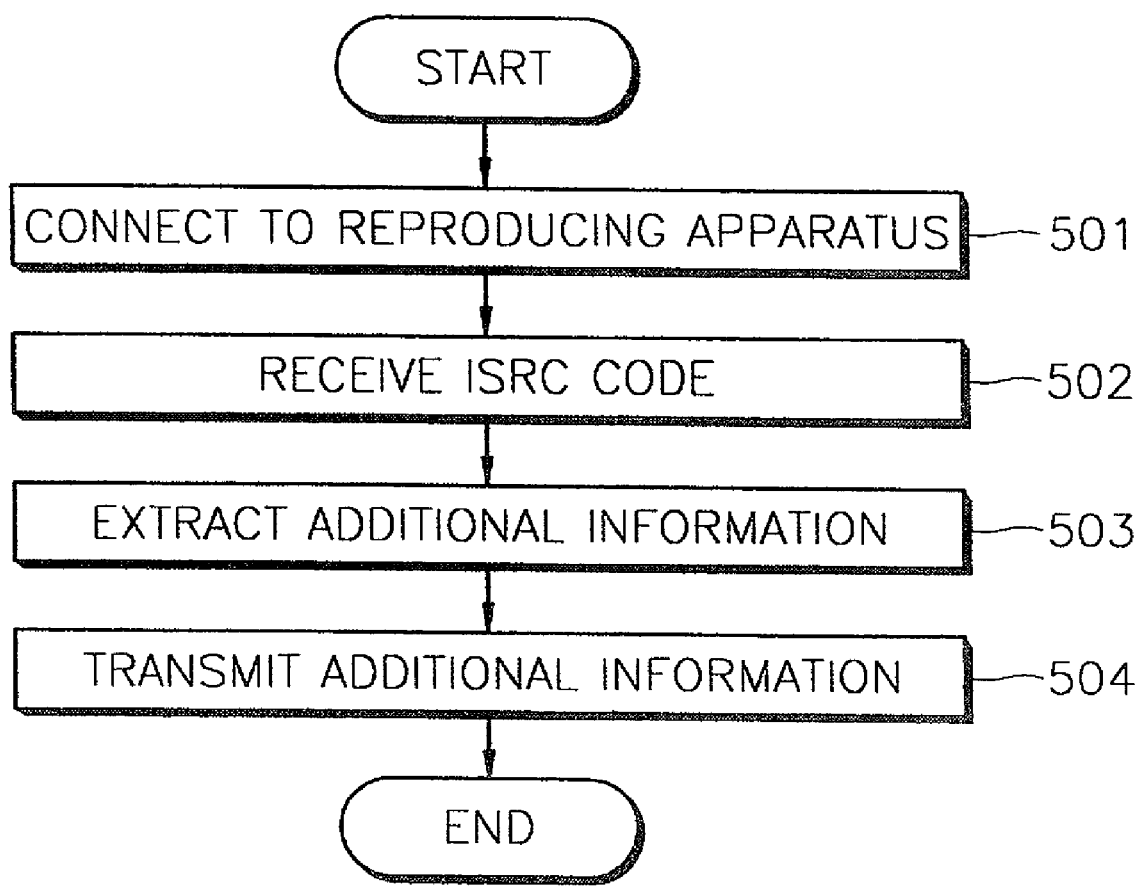

REPRODUCING APPARATUS AND SERVER SYSTEM PROVIDING ADDITIONAL INFORMATION THEREFOR

CROSS-REFERENCE TO RELATED APPLICATIONS

This application claims the benefit of Korean Application No. 2001-12444, filed Mar. 10, 2001, in the Korean Industrial Property Office, the disclosure of which is incorporated herein by reference.

BACKGROUND OF THE INVENTION

1. Field of the Invention

The present invention relates to a reproduction apparatus and a server system providing additional information, and more particularly, to a reproduction apparatus to read contents from storage media and to reproduce the read contents and a server system providing additional information that is connected to the reproduction apparatus through a network.

2. Description of the Related Art

Digital storage media such as CDS and DVDs, in which various contents such as audio and video information are recorded, are widely used. In particular, audio contents or video contents are recorded on CD-ROMs, DVD-audio, and DVD-videos, and the CD-ROMs, the DVD-audio, and the DVD-videos are then sold.

There are various additional information related to the audio contents or the video contents. For example, in the case of music videos, additional information could include the words of the songs, personal information items on the singers, contents of recent activities, and other hit songs of a similar genre. However, when a user desires to know such additional information, the user must access other media.

SUMMARY OF THE INVENTION

To solve the above and other problems, it is an object of the present invention to provide a server system that provides additional information on contents recorded on recording media such as CD-ROMs, DVD-audio, and DVD-videos through a network, and a reproduction apparatus to reproduce the recording media and receive the additional information.

It is another object of the present invention to provide a server system providing additional information that provides and receives a most recent of the additional information on the contents recorded in the recording media such as the CD-ROMs, the DVD-audio, and DVD-videos through a network, and a reproduction apparatus therefore.

Additional objects and advantages of the invention will be set forth in part in the description which follows and, in part, will be obvious from the description, or may be learned by practice of the invention.

To achieve the above and other objects, a reproduction apparatus to reproduce contents according to an embodiment of the present invention that includes an identifier generator to generate the identifier of the contents, a network connector and a controller to transmit the identifier generated by the identifier generator to a server system providing additional information through the network connector and to receive the additional information provided from the server system providing the additional information through the network connector.

According to an aspect of the present invention, the reproduction apparatus includes a reading unit to read data from storage media, in which the contents are stored.

According to another aspect of the present invention, the identifier generator receives an International Standard Recording Code (ISRC) read from the storage media by the reading unit and provides the ISRC as the identifier to the controller.

According to a further aspect of the present invention, the controller includes a browser that transmits the identifier to a server installed in the additional information service server system, receives additional information provided from the server, and displays the additional information.

According to a yet further aspect of the present invention, the reproduction apparatus further comprises a reading unit to read the contents from the recording media on which the contents are stored and a reproducer to reproduce contents read by the reading unit.

According to a still further aspect of the present invention, the reproducer further includes a decoder to decode read contents, a speaker to receive audio data output from the decoder and to deliver sound, and a display apparatus to receive video data output from the decoder and to display images.

According to another embodiment of the present invention, a server system that includes an additional information database to store additional information corresponding to a plurality of contents, and a server to receive an identifier with respect to predetermined contents from a reproduction apparatus that reproduces the contents, to receive the additional information corresponding to the identifier from the additional information data base, and to transmit the additional information to the reproduction apparatus.

According to an aspect of the present invention, the contents include an International Standard Recording Code (ISRC) and, the server receives the ISRC as the identifier, receives additional information mapped to the ISRC from the additional information data base, and transmits the additional information to the reproduction apparatus.

According to another aspect of the present invention, the reproduction apparatus preferably includes an identifier generator to generate the identifier of the contents, a network connector, and a controller to transmit the identifier generated by the identifier generator to a server system providing additional information through the network connector, to receive the additional information provided from the additional information service server system through the network connector, and to display the additional information.

According to a yet further aspect of the present invention, the reproduction apparatus further includes a reading unit to read data from the storage media on which the contents are stored.

According to a still further aspect of the present invention, the identifier generator receives the ISRC read from the storage media and provides the ISRC to the controller.

BRIEF DESCRIPTION OF THE DRAWINGS

The above and other objects and advantages of the present invention will become more apparent and more readily appreciated by describing in detail preferred embodiments thereof with reference to the attached drawings in which:

FIG. 5 is a flowchart of a process performed by a server system to provide the additional information.

DETAILED DESCRIPTION OF THE PREFERRED EMBODIMENTS

Figure 1:
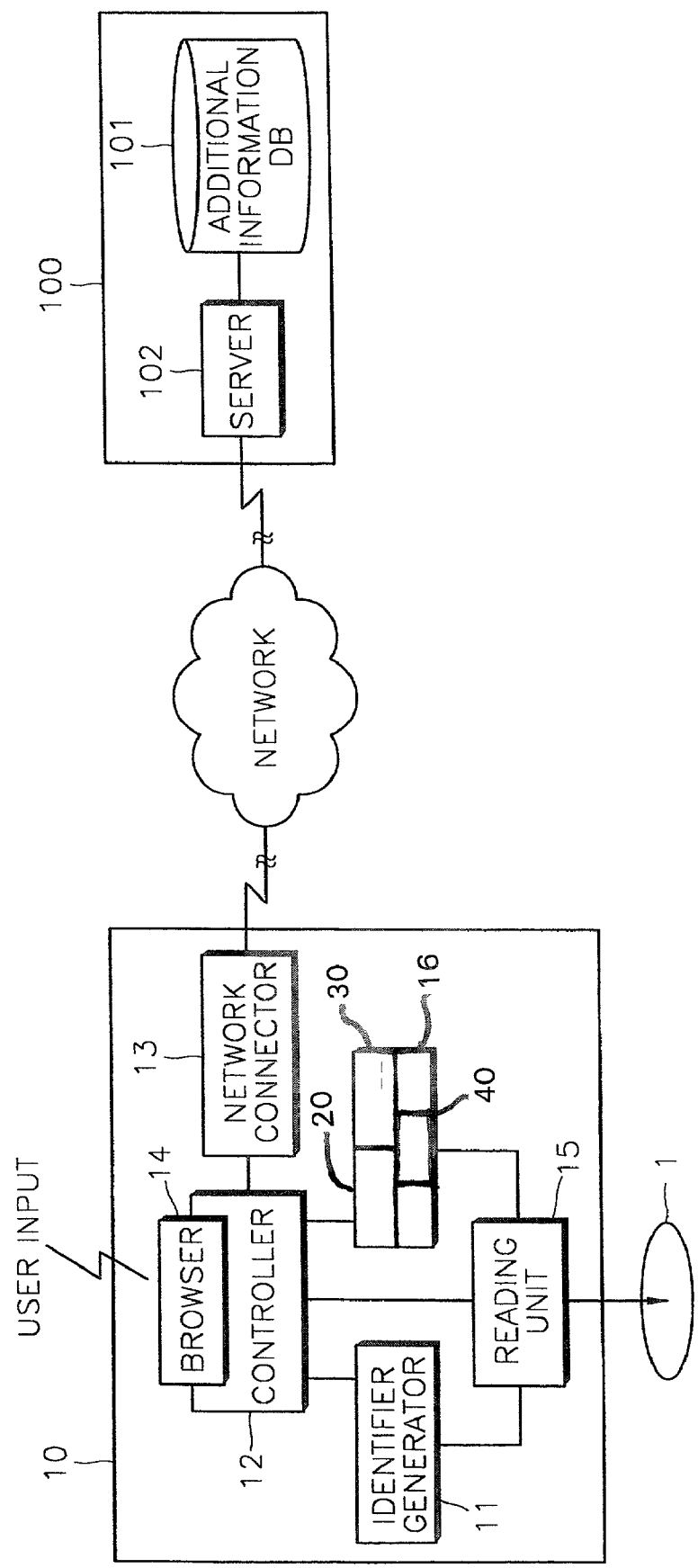
FIG. 1 schematically shows a reproduction apparatus and a server system providing additional information therefore according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 schematically shows a reproduction apparatus and a server system providing additional information therefore according to an embodiment of the present invention. One or more contents #1, #2, . . . , and #N and an international standard recording code (ISRC) given to the contents are recorded on an optical disc 1, which is a recording medium/ storage medium according to the present embodiment. The International Standard Recording Code (ISRC) code is an international standard code used for distinguishing music, songs, music videos and is given by the Recording Industry Association of America (RIAA). The ISRC includes a country code (2 characters), a copyright holder code (3 characters), a year of recording code (2 characters), and a recording number code (5 characters). The ISRC can be specific to each of the contents (i.e., to each track) or to all of the contents (i.e., a collection of tracks). However, the ISRC is not specific to the physical product and functions as an owner identification mechanism for the individual content or collection of contents. While the ISRC is disclosed as being the mechanism for indicating content ownership, it is understood that other mechanisms are available with regard to ownership of the contents.

A reproduction apparatus 10 includes an identifier generator 11, a controller 12, a network connector 13, a reading unit 15, and a reproducer 16. The identifier generator 11 generates an identifier with respect to the contents recorded in a storage medium/recording medium such as an optical disc 1. The identifier generated according to the present invention is the ISRC. The ISRC is read from the optical disc 1 by the reading unit 15 and is provided to the identifier generator 11. The network connector 13, which is a connection interface to be connected to the network, transmits predetermined information to the network or receives predetermined information from the network. A browser 14, which is used to search for information stored in a server system providing additional information 100, is installed in the controller 12. The browser 14 is a user interface to read a file online. The browser 14 according to the present invention is a web browser that transmits information to a server 102 installed in the server system 100, and receives information from the server 102 to be described more fully later. The web browser 14 is a client program using an Internet protocol, such as a hypertext transfer protocol (HTTP) and a file transfer protocol (FTP), in order to request material from a web server. It is understood that the network can be the Internet, a Large Area Network (LAN), a Wide Area Network (WAN), a Metropolitan Area Network (MAN), a public or private network of computers, a wireless network, or any interconnection of nodes by communication paths.

The reading unit 15 reads contents from the optical disc 1. The reproducer 16 reproduces the contents read by the reading unit 15. For this, the reproducer 16 can further include a decoder 40 to decode the read contents, a speaker 20 to receive audio data output from the decoder 40 and to deliver sound, and a display apparatus 30 to receive video data output from the decoder 40 and to display images. The speaker 20 and/or display apparatus 30 may not be included in the reproducer 16 and may be provided separately from the reproduction apparatus 10, if necessary.

The server system 100 includes an additional information database 101 and the server 102. In addition to the contents recorded in the optical disc 1, additional information on the various contents is stored in the additional information database 101 corresponding to the ISRC. Detailed description of additional information will be described later.

The server 102 receives the identifier on predetermined contents from the reproduction apparatus 10, extracts the additional information corresponding to the identifier from the additional information database 101, and transmits the additional information to the reproduction apparatus 10. The server 102, which is computer having a program encoded on a recordable medium to respond to requests from client programs such as the browser 14 in a client/server model, is a server program to provide web pages or files requested from the browser 14 when it accesses the web server 102 according to the present embodiment.

The server 102 transmits information to the browser 14 and receives information from the browser 14 through a "Cookie" file. The Cookie file is a text file stored in a client. In the present embodiment, the Cookie file is prepared by the browser 14 and is stored. The browser 14 stores the Cookie file, which includes the ISRC in a memory (not shown) included in the controller 12. The Cookie file is usually stored in the directory used by the browser 14. To be more specific, the browser 14 receives the identifier generated by the identifier generator 11 (i.e., the ISRC) and stores the ISRC in the Cookie file. The server 102 reads the Cookie file, identifies the ISRC, extracts the additional information corresponding to the ISRC from the additional information database 101, and transmits the extracted additional information to the reproduction apparatus 10. It is understood that the Cookie file can be a temporary file that is erased after the content is reproduced, or a more permanent file that reflects a record of contents previously reproduced.

Figure 2:
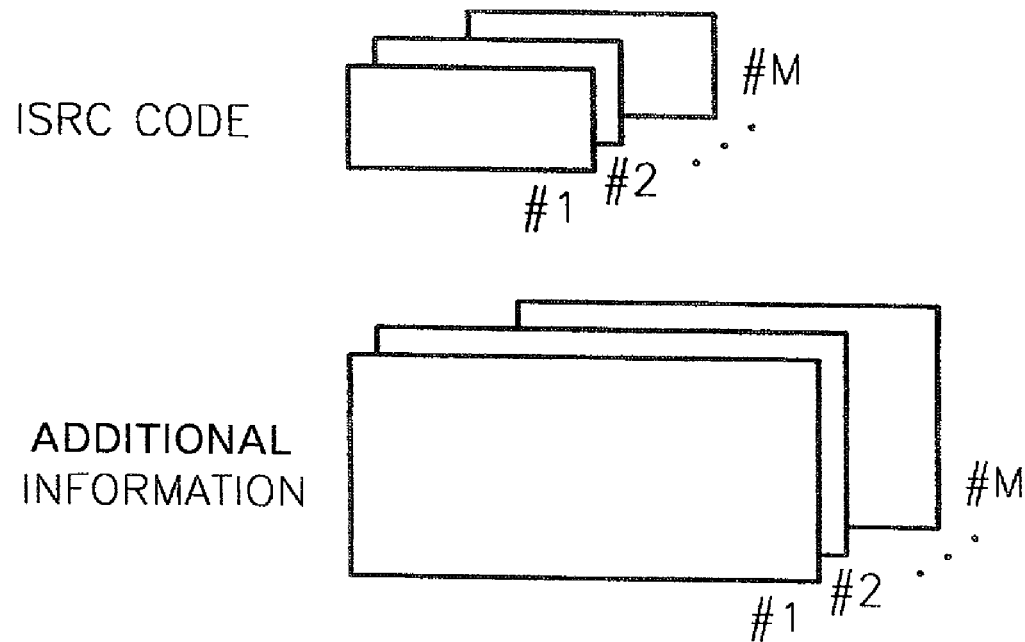
FIGS. 2 and 3 show the structure of data stored in an additional information database according to an embodiment of the present invention.

FIG. 2 shows the structure of data stored in the additional information database 101 according to the preferred embodiment of the present invention. Referring to FIG. 2, a plurality of ISRC and the additional information corresponding to the plurality of ISRC are stored in the additional information database 101. The additional information database 101 may be a relational database in the form of tables defined to access or reconstruct data by various methods. The additional information database 101 can be a distribution type database, in which data items are distributed in various points on a network, or an object-oriented data base, in which data defined by an object class and a sub class are consistent with each other.

Figure 3:
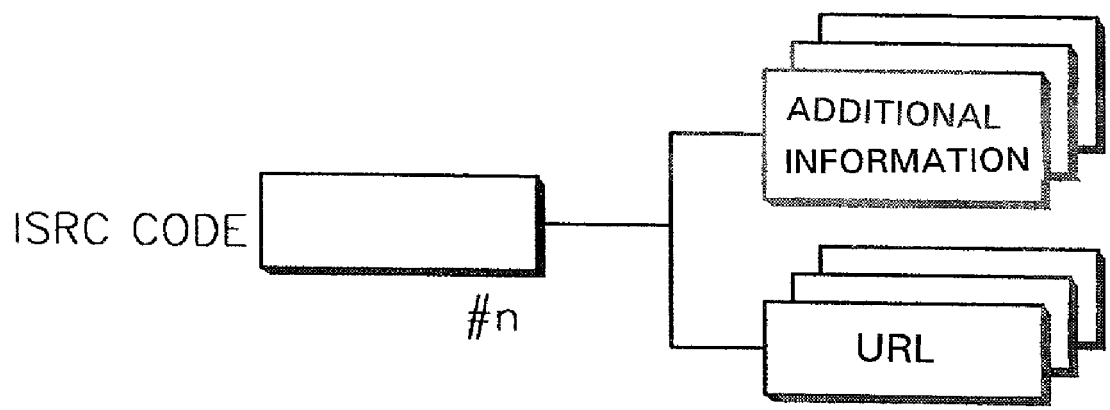

Referring to FIG. 3, the additional information is prepared to correspond to the ISRC and includes one or more uniform resource locators (URL) as a plurality of additional contents file and/or link information. The URL indicates the positions of resources, which can be accessed on the Internet. The URL consists of protocol names to access resources, domain names to distinguish specific computers on the Internet, and path names hierarchically to show the positions of files.

Processes of displaying additional information and a method of providing the additional information according to the present invention will now be described. It is generally understood that the controller 12 and/or the server 102 is a general or special purpose computer that implements the process of displaying the information items using computer software programs, which are stored on computer readable media.

Figure 4:
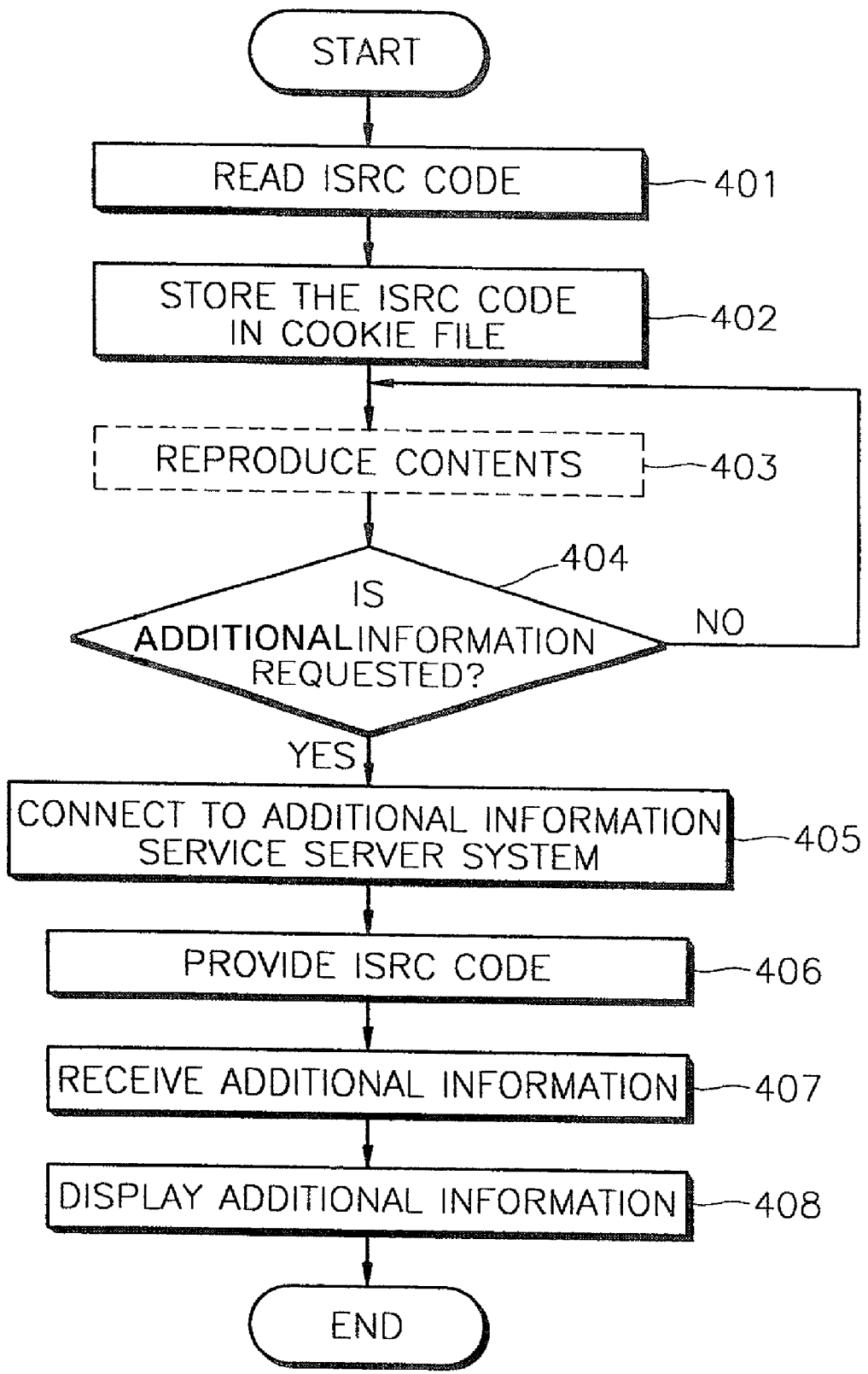
FIG. 4 is a flowchart of a process performed by a reproduction apparatus to display the additional information.

FIG. 4 is a flowchart showing the process performed by the reproduction apparatus 10 used to display the additional information. Referring to FIG. 4, when the optical disc 1 is inserted into the reproduction apparatus 10, the reading unit 15 reads the ISRC from the optical disc 10 and transmits the ISRC to the identifier generator 11 (operation 401). The identifier generator 11 transmits the ISRC to the controller 12, and the browser 14 stores the received ISRC in the Cookie file (operation 402). When a user input is received in the controller 12, the reading unit 15 reads corresponding contents and the reproducer 16 reproduces the read contents (operation 403). When the user input requesting the additional information is received in the controller 12 during the reproduction of the contents (operation 404), the browser 14 is called and connected to the server system 100 through the network connector 13 (operation 405).

The browser 14 provides the ISRC stored in the Cookie file to the server 102 of the server system 100 (operation 406). The browser 14 receives the additional information provided from the server 102 (operation 407), and displays the received additional information (operation 408).

It is understood that operation 403 can be omitted. Namely, the user can request additional information on specific contents when the contents are not being reproduced. In this case, when the user requests the additional information, the controller 12 (or the browser 14) displays menu screens with respect to all the contents recorded in the optical disc 1. The additional information is provided by the browser 14 providing the ISRC with respect to the selected contents to the server 102 when the user selects the specific contents.

FIG. 5 is a flowchart showing the process of the server system 100 used to provide the additional information. Referring to FIG. 5, the server 102 of the server system 100 is connected to the reproduction apparatus 10 through the network (operation 501). The server 102 requests the ISRC from the browser 14 installed in the reproduction apparatus 10 and receives the ISRC (operation 502). The server 102 extracts the additional information corresponding to the received ISRC from the additional information data base 101 on the basis of the received ISRC (operation 503) and transmits the extracted additional information to the browser 14 (operation 504).

In the above embodiment, the identifier generator 11 receives the ISRC read from the optical disc 1 by the reading unit 15. However, it is understood that the identifier generator 11 can be provided so as to receive header information of the contents recorded in the optical disc 1, and to generate a predetermined identifier on the basis of the header information. Also, it is understood that the additional information may be stored in the additional information database 101 to correspond to the new identifier generated from the header information.

As mentioned above, according to the present invention, a server system providing additional information, which is capable of providing and receiving the additional information on the respective contents through the network, and a reproduction apparatus therefore are provided. Accordingly, the user can receive the most recent additional information with respect to the specific contents.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A reproduction apparatus for reproducing contents, comprising:
    an identifier provider for providing an identifier of the contents read from a storage medium storing the predetermined contents and the contents identifier;
    a network connector; and
    a controller for storing the contents identifier provided by the identifier provider as a Cookie file, transmitting the stored Cookie file including the contents identifier through the network connector to a server system, which provides additional information related to the contents through the network connector, and receiving through the network connector the additional information provided from the server system after the stored contents identifier was transmitted.

2. The reproduction apparatus of claim 1, further comprising a reading unit for reading data from the storage medium, in which the contents are stored, and reads the contents identifier from the at least one storage medium, wherein the identifier provider provides the read contents identifier read from the at least one storage medium to the controller.

3. The reproduction apparatus of claim 1, further comprising a reading unit for reading data from the storage medium, in which the contents are stored, and reads an international standard recording code (ISRC) from the at least one storage medium, wherein the identifier provider receives the ISRC read and provides the ISRC as the contents identifier to the controller.

4. The reproduction apparatus of claim 1, further comprising:
    a reading unit for reading the contents from the storage medium in which the contents are stored; and
    a reproducer for reproducing contents read by the reading unit.

5. The reproduction apparatus of claim 4, wherein the reproducer further comprises a decoder for decoding the read contents.

6. The reproduction apparatus of claim 5, wherein the reproducer further comprises:
    a speaker for receiving audio data output from the decoder and delivering sound; and
    a display apparatus for receiving video data output from the decoder and displaying images.

7. The reproduction apparatus of claim 1, wherein the received additional information is reproduced without reproducing the corresponding contents.

8. The reproduction apparatus of claim 1, further comprising a browser, and the controller controls the browser to prepare and store the Cookie file with the contents identifier in the prepared Cookie file, and uses the browser to transmit the stored Cookie to the server system and to receive the additional information provided from the server system after transmitting the stored Cookie.

9. The reproduction apparatus of claim 1, wherein:
    the controller receives an input requesting retrieval of the additional information, if the received input requests receipt of the additional information without reproducing the corresponding contents, the additional information is retrieved from the server system using the Cookie file without reproducing the corresponding contents, and if the received input requests the additional information while reproducing the corresponding contents, the additional information is retrieved from the server system using the Cookie file while reproducing the corresponding contents.

10. The reproduction apparatus of claim 1, further comprising a memory in which the controller stores the Cookie file prior to providing the Cookie file to the server system.

11. The reproduction apparatus of claim 1, wherein the contents comprises audio and/or video predetermined contents, and the additional information includes words of a song of the audio and/or video contents, personal information items on singers of the audio and/or video contents, contents of recent activities of the audio and/or video contents, other songs of a similar genre of the audio and/or video contents, or combinations thereof.

12. A server system providing additional information items, comprising:
an additional information database which stores additional information items related to a plurality of contents; and
a server for receiving a Cookie file including an identifier of predetermined contents from a reproduction apparatus for reproducing the contents and which retrieved the contents identifier from a recording medium storing the predetermined contents and the contents identifier, the Cookie file being prepared by and stored by a browser on the reproduction apparatus prior to transmission to the server, retrieving one of the additional information items related to the contents identifier from the additional information data base according to the received file, and transmitting the retrieved one additional information item to the reproduction apparatus.

13. The server system of claim 12, wherein:
an international standard recording code (ISRC) is recorded in at least one recording medium on which the contents are recorded, and
the server receives the ISRC code as the contents identifier, retrieves the one of the additional information items mapped to the ISRC code from the additional information database, and transmits the retrieved one additional information item to the reproduction apparatus.

14. The server system of claim 12, wherein:
the server transmits the additional information item corresponding to the received contents identifier to the reproduction apparatus, and the reproduction apparatus comprises:
an identifier provider for providing the identifier of the contents,
the browser,
a network connector, and
a controller to control the browser to prepare and store the Cookie file including the identifier from the identifier provider prior to transmission to the server, to use the browser to transmit the stored identifier to the server through the network connector, to use the browser to receive the retrieved one additional information item transmitted from the server through the network connector corresponding to the transmitted identifier, and to control a display of the received one additional information item.

15. The server system of claim 14, wherein:
the reproduction apparatus further comprises a reading unit for reading data from at least one storage medium,
the at least one storage medium stores the contents,
the identifier provider provides the contents identifier read from the at least one storage medium to the controller, and
the controller receives the contents identifier from the reproduction apparatus for transmitting the contents identifier provided by the identifier provider through the network connector to the server.

16. The server system of claim 15, wherein the server receives an international standard recording code (ISRC) read from the at least one storage medium by the reading unit and provides the received ISRC code as the contents identifier to the controller.

17. The server system of claim 12, wherein the server receives the contents identifier from the browser installed in a controller of the reproduction apparatus.

18. The server system of claim 17, wherein the server receives the contents identifier from the browser installed in the controller of the reproduction apparatus as the Cookie file prepared by the browser.

19. The server system of claim 12, wherein the contents comprises audio and/or video predetermined contents, and the additional information items include words of a song of the audio and/or video contents, personal information items on singers of the audio and/or video contents, contents of recent activities of the audio and/or video contents, other songs of a similar genre of the audio and/or video contents, or combinations thereof.

20. An computer readable medium for use with a recording and/or reproducing apparatus and comprising a Cookie program which implements a method of generating a Cookie file used by the apparatus, the method comprising:
detecting an identifier of predetermined contents; and
preparing and storing the detected contents identifier in the Cookie file for use in a subsequent transmission by the apparatus to a server system providing additional information related to the predetermined contents through a network connector of the apparatus in response to the sent Cookie file,
wherein the contents identifier is an international standard recording code (ISRC) read from a recording medium.

21. The computer readable medium of claim 20, wherein the method further comprises reading the contents identifier from the recording medium on which the contents are stored.

22. The computer readable medium of claim 21, wherein the Cookie file is prepared by the apparatus and is stored on the apparatus prior to transmission, and the Cookie file includes the contents identifier read from the recording medium.

23. The computer readable medium of claim 21, wherein the Cookie file is prepared by a browser provided in the apparatus and is stored prior to transmission, and the Cookie file includes the contents identifier read from the recording medium.

24. The computer readable medium of claim 21, wherein the Cookie file is prepared by a browser provided in the apparatus and is stored prior to transmission, and the method further comprises transmitting the Cookie file to the server system providing the additional information through a network.

25. The computer readable medium of claim 20, wherein the predetermined contents comprises audio and/or video predetermined contents, and the additional information includes words of a song of the audio and/or video contents, personal information items on singers of the audio and/or video contents, contents of recent activities of the audio and/or video contents, other songs of a similar genre of the audio and/or video contents, or combinations thereof.

26. A method of providing additional information comprising:
  storing in an apparatus a contents identifier to identify predetermined contents read from a storage medium storing the predetermined contents and the contents identifier, the contents identifier being stored in a Cookie file by a browser of the apparatus which is separated from a server system by a network connector;
  transmitting, through the network connector, the stored Cookie file including the contents identifier to the server system providing additional information related to the provided contents identifier; and
  receiving, through the network connector, the additional information provided from the server system.

27. The method of claim 26, wherein the storing the contents identifier includes reading the contents identifier from a recording medium storing the predetermined contents.

28. The method of claim 26, wherein the storing the contents identifier includes reading an International Standard Recording Code (ISRC) as the contents identifier from a recording medium storing the predetermined contents.

29. The method of claim 26, wherein the predetermined contents comprises audio and/or video contents, and the additional information includes words of a song of the audio and/or video contents, personal information items on singers of the audio and/or video contents, contents of recent activities of the audio and/or video contents, other songs of a similar genre of the audio and/or video contents, or combinations thereof.

30. The method of claim 29, wherein the audio and/or video contents are retrieved from an information storage medium having the contents identifier, and the additional information are not stored on the information storage medium.

31. The method of claim 26, further comprising reproducing the received additional information without reproducing the corresponding predetermined contents.

32. The method of claim 26, further comprising reproducing the received additional information while reproducing the corresponding predetermined contents.

33. The method of claim 26, further comprising:
  receiving at the apparatus an input requesting reproduction of the additional information,
  if the received input requests reproduction of the additional information without reproducing the corresponding predetermined contents, the additional information which was received from the server system using the contents identifier is reproduced without reproducing the corresponding predetermined contents, and
  if the received input requests reproduction of the additional information while reproducing the corresponding predetermined contents, the additional information which was received from the server system using the contents identifier is reproduced while reproducing the corresponding predetermined contents.

* * * * *